US008027861B2

(12) United States Patent
Brintle

(10) Patent No.: US 8,027,861 B2
(45) Date of Patent: Sep. 27, 2011

(54) SYSTEMS AND METHODS FOR SHARED TASK MANAGEMENT

(76) Inventor: Lee Page Brintle, North Liberty, IA (US)

( * ) Notice: Subject to any disclaimer, the term of this patent is extended or adjusted under 35 U.S.C. 154(b) by 1424 days.

(21) Appl. No.: 11/422,120

(22) Filed: Jun. 5, 2006

(65) Prior Publication Data

US 2007/0282658 A1 Dec. 6, 2007

(51) Int. Cl.
*G06Q 10/00* (2006.01)
(52) U.S. Cl. ............... 705/7.26; 705/8; 709/219; 726/4; 726/17
(58) Field of Classification Search ................. 705/8, 9, 705/10
See application file for complete search history.

(56) References Cited

U.S. PATENT DOCUMENTS

| | | | |
|---|---|---|---|
| 6,035,278 A | 3/2000 | Mansour | |
| 6,101,481 A | 8/2000 | Miller | |
| 6,507,845 B1 | 1/2003 | Cohen | |
| 6,678,714 B1 | 1/2004 | Olapurath | |
| 7,430,535 B2 * | 9/2008 | Dougherty et al. | 705/38 |
| 2002/0040313 A1 * | 4/2002 | Hunter et al. | 705/9 |
| 2002/0055870 A1 * | 5/2002 | Thomas | 705/10 |
| 2002/0069235 A1 * | 6/2002 | Chen | 709/104 |
| 2002/0103689 A1 * | 8/2002 | Hornick et al. | 705/9 |
| 2002/0161602 A1 * | 10/2002 | Dougherty et al. | 705/1 |
| 2002/0165951 A1 * | 11/2002 | Watkins | 709/223 |
| 2002/0169650 A1 * | 11/2002 | Dougherty et al. | 705/8 |
| 2003/0004736 A1 * | 1/2003 | Calderaro et al. | 705/1 |
| 2003/0004967 A1 * | 1/2003 | Calderaro et al. | 707/104.1 |
| 2003/0014533 A1 * | 1/2003 | Greene et al. | 709/232 |
| 2003/0055937 A1 * | 3/2003 | Matsushima et al. | 709/223 |
| 2003/0074247 A1 | 4/2003 | Dick et al. | |
| 2003/0149714 A1 * | 8/2003 | Casati et al. | 709/100 |
| 2003/0233586 A1 * | 12/2003 | Urakami et al. | 713/202 |
| 2004/0006501 A1 * | 1/2004 | Aviyants | 705/8 |
| 2004/0064329 A1 * | 4/2004 | Broad et al. | 705/1 |
| 2004/0220825 A1 * | 11/2004 | Schwerin-Wenzel et al. | 705/1 |
| 2004/0267589 A1 * | 12/2004 | Wallman | 705/9 |
| 2004/0267595 A1 * | 12/2004 | Woodings et al. | 705/9 |
| 2005/0080656 A1 * | 4/2005 | Crow et al. | 705/8 |
| 2005/0080657 A1 * | 4/2005 | Crow et al. | 705/8 |
| 2005/0096961 A1 * | 5/2005 | Schaaf et al. | 705/9 |

(Continued)

OTHER PUBLICATIONS

Zhang, Longhua (2006). Role-based delegation: Models and mechanisms. Ph.D. dissertation, The University of North Carolina at Charlotte, United States—North Carolina.*

(Continued)

*Primary Examiner* — Lynda C Jasmin
*Assistant Examiner* — Gurkanwaljit Singh
(74) *Attorney, Agent, or Firm* — Alston & Bird LLP

(57) ABSTRACT

A task management system is disclosed for providing shared task management among a variety of users and allows users to create and share task-lists and tasks. Users can invite others to join task-lists and can assign responsibility for tasks to other users. In various embodiments, the system implicitly sets permissions for every task-list and task, and these permissions are automatically changed or updated by the system in response to users interacting with the system. In another embodiment, users can explicitly set these permissions. Thus, the task management system is configured so that there is no single administrator of the system; rather each user may be an administrator of certain tasks and task-lists and thus set the related task and task-list permissions. Thus, the system is configured to operate in the absence of explicitly set permissions, but is also flexible to allow for users to change and modify permissions explicitly.

19 Claims, 9 Drawing Sheets

U.S. PATENT DOCUMENTS

| | | | |
|---|---|---|---|
| 2005/0149376 A1 | 7/2005 | Guyan et al. | |
| 2006/0047530 A1* | 3/2006 | So et al. | 705/1 |
| 2006/0075071 A1* | 4/2006 | Gillette | 709/219 |
| 2006/0080116 A1* | 4/2006 | Maguire et al. | 705/1 |
| 2006/0106774 A1 | 5/2006 | Cohen et al. | |
| 2006/0143034 A1* | 6/2006 | Rothermel et al. | 705/1 |
| 2006/0179409 A1* | 8/2006 | Kaisermayr | 715/736 |
| 2006/0224404 A1* | 10/2006 | Keusseyan | 705/1 |
| 2006/0229896 A1* | 10/2006 | Rosen et al. | 705/1 |
| 2006/0259340 A1* | 11/2006 | Doherty et al. | 705/9 |
| 2007/0073572 A1* | 3/2007 | McLaughlin et al. | 705/9 |

OTHER PUBLICATIONS

Lorch, Markus (2004). PRIMA: Privilege management and authorization in grid computing environments. Ph.D. dissertation, Virginia Polytechnic Institute and State University, United States.*

Kristi Gaylord. (Feb. 2000). Exercise control over your network with permissions. Windows Professional, 7(2), 1-7.*

Fabio Casati, Silvana Castano, & MariaGrazia Fugini. (2001). Managing Workflow Authorization Constraints through Active Database Technology. Information Systems Frontiers: Special Issue: Information Systems Frontiers on Workflow, 3(3), 319.*

R Goodwin, S F Goh, & F Y Wu. (2002). Instance-level access control for business-to-business electronic commerce. IBM Systems Journal, 41(2), 303-317.*

Shafiq, Basit (2006). Access control management and security in multi-domain collaborative environments. Ph.D. dissertation, Purdue University, United States—Indiana.*

Miller, Mark Samuel (2006). Robust composition: Towards a unified approach to access control and concurrency control. Ph.D. dissertation, The Johns Hopkins University, United States.*

Zhang Yi, Zhang Yong, & Wang Weinong. (2004). Modeling and Analyzing of Workflow Authorization Management. Journal of Network and Systems Management, 12(4), 507.*

Frank Gruber, TechCrunch, "Do More: Online to Do Lists Compared", http://www.techcrunch.com/2006/05/08/do-more-online-to-do-lists-compared/ (May 8, 2006).

Melissa MacBeth, Tasks and Time Management in Outlook, "The Task Module", http://blogs.msdn.com/ melissamacbeth/archive/2006/02/24/538989.aspx (Feb. 24, 2006).

International Search Report and Written Opinion for PCT/US07/13195 dated Nov. 12, 2008.

* cited by examiner

SYSTEMS AND METHODS FOR SHARED TASK MANAGEMENT

FIELD OF THE INVENTION

The present invention provides for systems and methods for shared task management in a computer network environment.

BACKGROUND OF THE INVENTION

The "to do" list is a familiar item for many persons to track tasks that must be done both at work and at home. Such lists commonly include the things they need to accomplish on a particular day, in a particular week, or in a particular month or year. Often these "to-do" lists are for job-related tasks (such as projects, meetings, phone calls, etc.), family- or home-related tasks (such as chores, family vacations, etc.), or personal tasks (such as errands, exercising, etc.).

Frequently, people can forget to create to-do lists for these tasks, and can ultimately forget to perform these tasks. In other instances, people may have tasks in common with others (such as a husband sharing a common task with his wife, such as making reservations for a wedding anniversary dinner), but may fail to communicate or share these tasks with others.

Currently known task management systems fail to solve these and other problems, and have even created additional problems with regard to sharing tasks among a variety of users. These systems can be cumbersome to use and make it difficult for users to share tasks with others. A drawback of many known task management systems is that they may require a single administrator to set all permissions of the system, or they require users to explicitly set permissions of each task created, such as by explicitly setting permissions for those users with whom the user desires to share a task. Another drawback is that a user may not be able to specify which tasks to share with others, but may only have the option of sharing all tasks with others, and then have to manually select those tasks which the user would like to maintain as private. Thus, as the number of tasks pertaining to a user steadily increases, the chore of maintaining and setting permissions of the tasks becomes increasingly cumbersome.

Because of the permissions model of many current systems, these systems also make it difficult for a first user to see the tasks assigned to another user. A first user may desire to see tasks assigned to a variety of other users in order to determine which user is the least busy, so as to then assign a task to that user. However, in many instances, a first user may only be able to see tasks assigned to a second user if the second user has explicitly enabled the first user to see his tasks. Thus, when a user desires to assign a task to another user, he may not be able to first determine how busy the other user is prior to assigning him a task.

"Spam" email has become a common problem with users of electronic mail systems, and this problem has the potential to pervade known task management systems. Because of the threat of "spam", known task management systems are restricted to a limited audience, thus preventing the sharing of tasks among a wide variety of users.

Therefore, there is a need for improved systems and methods for shared task management which solves these and other problems.

BRIEF SUMMARY OF THE INVENTION

The various embodiments of the invention overcome the problems noted above and achieve significant advantages over previous approaches to task management.

One aspect of the present invention is a task management system connected to a communication network with one or more users operating respective computing devices. The task management system is comprised of one or more task management computers executing an application with which the users interact via the respective computing devices. The task management computer is configured to enable one or more first users to generate a designation of one or more second users to a task-list or task, which is a member of one or more task-lists. The tasks and task-lists have associated permissions, which the task management computer changes automatically with respect to the second users based on the first-user designation.

In one aspect, the first-user designation comprises a selection of one or more second users to join a task-list, the selection being made from a list of one or more potential second users who may join the task-list.

In another aspect, the first-user designation comprises a selection of one or more second users to be made responsible for a task, the selection being made from a list of one or more potential second users who may be made responsible for the task.

Another aspect of the present invention is a computer-readable storage medium storing an application for shared task management among one or more users. The application directs a computer to perform the steps of: (1) receiving from a first user a designation of one or more second users to a task-list or task, the task being a member of one or more task-lists, the task-list and task having associated permissions; and (2) automatically changing the task-list and task permissions based on the first-user designation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
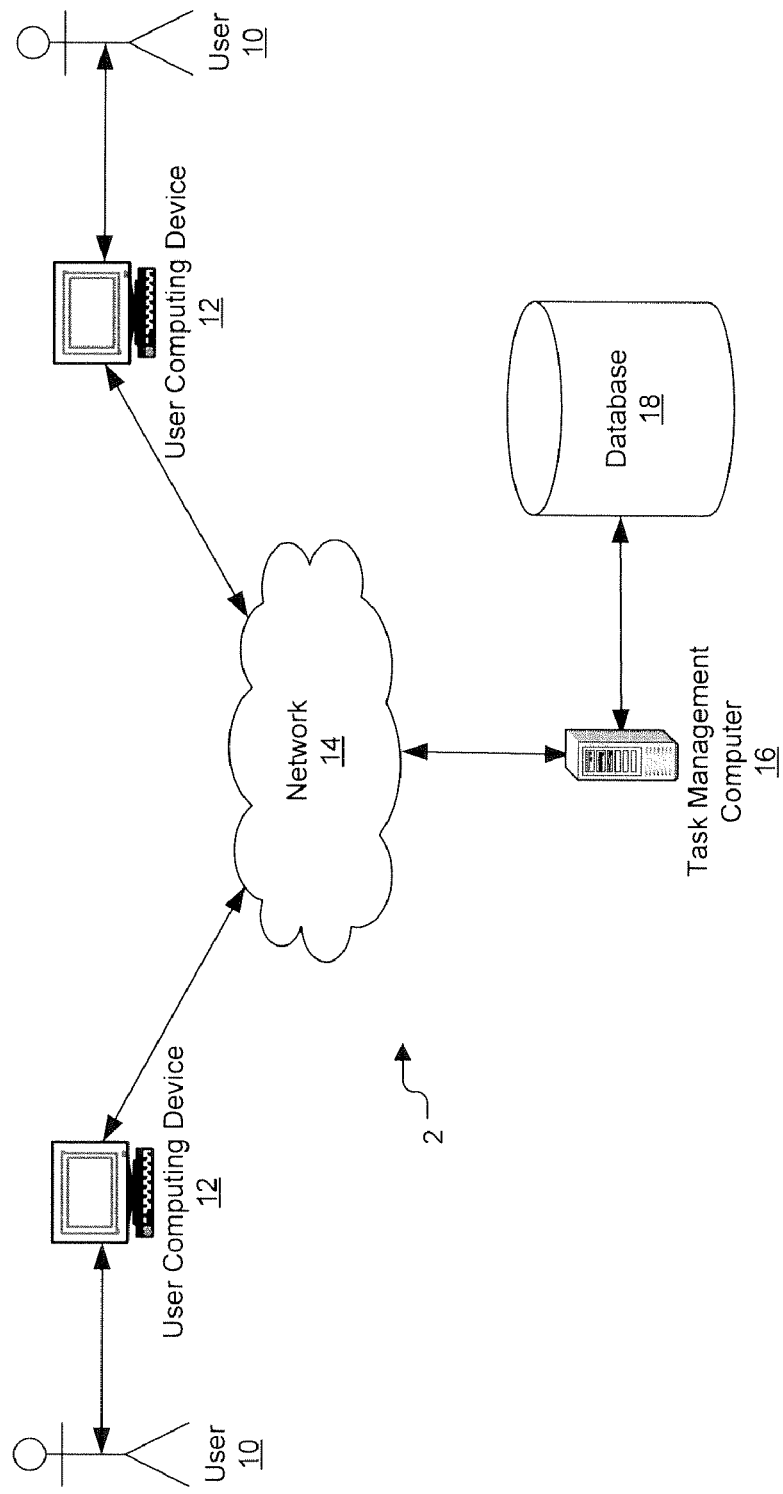
FIG. 1 is a general diagram of a Task Management System, including a task management computer, according to one embodiment of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

GLOSSARY

The following terms are defined below in order to allow for a better understanding of embodiments of the present invention. However, the terms are not meant to be limited to the definitions provided below, and may be understood further from the descriptions provided throughout, as well as in light of ordinary definitions known to those of ordinary skill in the art.

'Computer' or 'computing device' broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

'Connected' refers to a physical or wireless connection between two computing devices permitting communication of data. Two devices can be connected directly together or indirectly through one or more intermediate elements, through connection media that permit communication of data or a signal from one device to the other. Connection media include wire, optical fiber, or wireless transmission, for example.

'Server' can refer alternatively to a computing device or a program executing on one or more computing devices, which accepts request data from other computing devices or "client" applications, processes the data through a set of computer instructions in the program, and returns the resulting processed data to the requesting computing device or client application. Common servers include web servers, email servers, file servers, database servers, and network servers.

Overview

Various embodiments of the present invention are directed to a task management system for providing shared task management among a variety of users. It is assumed that prior to using the task management system, various users have registered with the system such as by providing their names, desired usernames for the system, a password associated with the username, and contact information including, for example, a phone number, address, and email address. In one aspect, the system allows users to create and share task-lists and tasks. Task-lists represent a collection of tasks; similarly, tasks are members, or subsets, of task-lists, and are akin to "to-do" items, in that they represent a function to be performed or an objective to be accomplished.

As an example, a user of the task management system may create a task-list entitled "Work"; the user would want tasks within the "Work" task-list be tasks related to the user's work, such as "Call Client", "Attend Meeting", etc. The user can then invite other users of the system to join the task-list, such as the user's co-worker(s). In another aspect, the user may want to make another user of the system responsible for a task, and thus assign the task to another user. These are some of the many ways in which a user may interact with the task management system.

In a further aspect, the system can set permissions for every task-list and task in the system, and these permissions are automatically changed or updated by the system in response to users interacting with the task management system, as will be described further below. In another aspect, task-list and task permissions can be set explicitly by users of the system, if so desired. In these aspects, the task management system is configured so that there is no single administrator of the system that must set permissions for all users; rather each user may be an administrator of certain tasks and task-lists and thus set the related task and task-list permissions. Thus, the system is configured to operate in the absence of explicitly set permissions, but is also flexible to allow for explicitly set permissions.

Structure of an Exemplary Task Management System

As shown in FIG. 1, in various embodiments the task management system 2 generally includes one or more users 10 interfacing with a user computing device 12, using various input devices (e.g., keyboard, mouse, touch-screen, wand, stylus, voice receiver, or other device) and output devices (e.g., display, monitor, printer, speaker, or other device). The user computing device 12 is connected to a task management computer 16 through a network 14, such as a Wide Area Network (WAN, such as the Internet), or Local Area Network (LAN). As described above, the task management system 2 is configured to allow users to interact with the task management computer 16 to manage and share tasks and task-lists. Users can create task-lists and tasks, assign responsibility for tasks to other users, organize tasks into task-lists, invite other users to watch or join certain task-lists, watch task-lists to which they have been invited and watch tasks within those task-lists, and view tasks assigned to other users, among other functions. The task management computer 16 supports these user interactions by manipulating the aforementioned task-list and task permissions, along with user specific permissions, in the attached database 18. The database 18 may be local to the task management computer 16, or may be located remotely as shown in the FIG. 1.

The task management computer 16 may be understood, in various embodiments, to refer collectively to one or more computing devices executing a client program, such as a web server or thick client, connected to one or more task management servers. A task management computer 16 may also encompass the task management servers, and/or a multiplexing gateway. Thus, in one embodiment of the present invention, the task management computer 16 as shown in FIG. 1 may be the global provider site 200 as shown in FIG. 2.

In various embodiments, the database 18 is configured to store data related to tasks and task-lists, as well as data associated with users of the task management system 2. For instance, data maintained for each task can include a task name, description, one or more containing (or "parent") task-lists, currently assigned user(s), default permissions for all users, notes or comments, a "last seen" or "last state" value for one or more users (see below), or other data. Similarly, data maintained for each task-list can include a task-list name, description, default permission for all users, a "last seen" or "last state" value for one or more users, or other data. As discussed above, data maintained for each user may include the user's name, a username, password, email address, contact information, permissions information, or other information.

Figure 2:
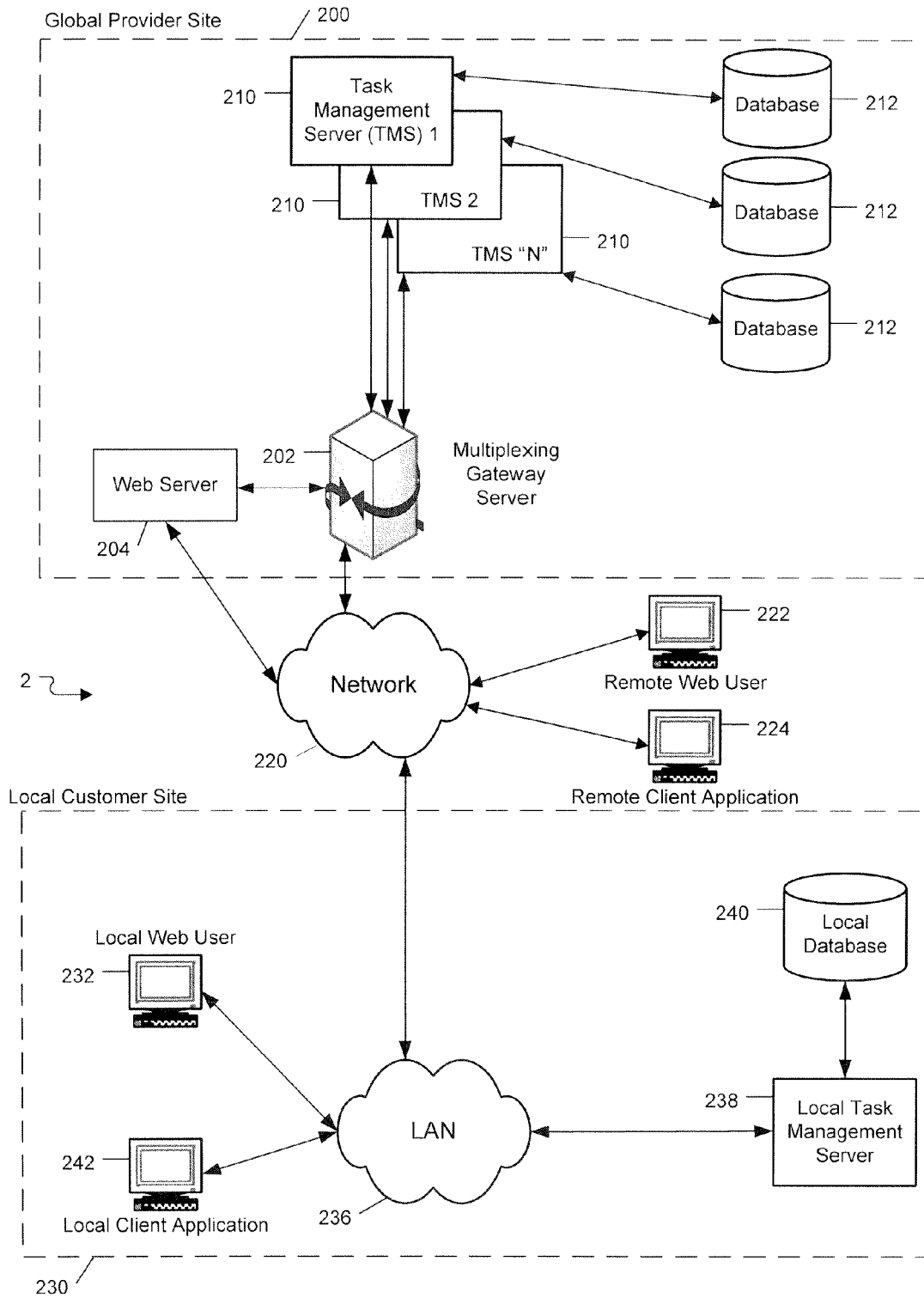
FIG. 2 is a diagram of a Task Management System, including one or more task management servers, according to one embodiment of the present invention.

A task management system 2 according to another embodiment of the invention is shown in FIG. 2. As may be understood from this Figure, in this embodiment, the system 2 includes a global communication network 220 such as the Internet connecting a global provider site 200 with multiple users, including one or more remote users 222, 224, and one or more users 232, 242 local to one or more local customer sites 230. An exemplary local customer site 230 can be a company, which has signed up for service with the global provider, and has various users (such as its employees) that can connect to the global provider site 200 via a local area network (LAN) 236 located within the local customer site 230. Alternatively, the local customer site can represent a group of users (such as users 232, 234) who share a common network, such as students at a university, members of a family, etc.

In the embodiment shown in FIG. 2, the local customer site 230 contains a local task management server 238 and an associated local database 240, which are configured to store or host tasks and task-lists related to the local customer site 230. In this manner, confidential information that may be part of the tasks and task-lists can be stored locally to the local customer site. The multiplexing gateway server 202, as described below, is configured to allow tasks and task-lists of the task management system 2 to be stored on multiple task management servers (such as the global provider task management server(s) 210 and the local task management server 238), which eliminates the need for a single, central server to store all tasks and task-lists for the task management system 2.

In alternative embodiments (not shown), the local customer site 230 may not include a local task management server or local database, so that task, task-list, and user related information for the local users 232, 242 would be hosted and stored on the task management server(s) 210 and associated database(s) 212 at the global provider site 200.

An exemplary remote user 222, 224 may be an individual user of the task management system that connects directly to the task management system 2 via a global communication network 220 (such as the Internet), as shown in FIG. 2. Local users and remote users utilize user computing devices which can access the task management system services through a web browser connected to a web-based client application hosted at the global provider site 204 or through locally hosted client applications executing on the user computing devices communicating directly with the multiplexing gateway server 202 located at the global provider site 200.

As will be understood, such client applications can be implemented by computer program instructions. These computer program instructions may be loaded onto the computers of various users of the system 2 or may be provided by the global provider site 200 and hosted as a web-based application as described above, such that the instructions which execute on the computer or other apparatus create the means for implementing the functions described herein. These program instructions may also be stored in a computer-readable memory that can direct a computer or other apparatus to function in the particular ways described throughout.

The global provider site 200, as shown in FIG. 2, includes a web server 204, multiplexing gateway server 202, and one or more task management server(s) 210 connected to associated database(s) 212. The databases 212 are configured to store information as described above with respect to the database 18 connected to the task management computer 16. The task management servers 210 are configured to process requests from one or more associated client programs and to retrieve and manipulate user, task, task-list and permissions data from the one or more databases 212. In an alternative embodiment (not shown), the multiplexing gateway 202 may be located remotely from the global provider site 200. In one aspect, various global provider sites 200 or task management computers 16 may exist, each separately hosting a task management server 210 and associated database 212. In such a case, the multiplexing gateway 202 would be located remotely from the global provider sites 200 to allow for more efficient routing of requests to the various task management servers 210 (described below).

Multiplexing Gateway Server

In order to provide flexibility in the configuration of the task management system 2, many embodiments of the invention include a multiplexing gateway server 202. The multiplexing gateway is a server responsible for routing requests from one or more connected client programs to one or more connected task management servers (such as the task management server(s) 210 and the local task management server 238) based on the type of request and the location of the associated data, consolidating the responses from the task management servers and routing the response data to the requesting client program. For example, in the embodiment of the invention illustrated in FIG. 2, the multiplexing gateway server 202 routes requests from various client programs (associated for example with remote users 222, 224 or local users 232, 242) to multiple task management servers 210 as well as local task management servers 238 hosted at local customer sites 230. The various task management servers (e.g., 210 and 238) respond to the requests by accessing and manipulating user, task-list, task, and permission data stored on global databases 212 and local databases 240. The multiplexing gateway server 202 consolidates the responses from the various task management servers 210, 238 into a single communication back to the requesting client program.

The multiplexing gateway server 202 determines to which of the various task management servers to route the request. When the client program requests updates to the user's catalog display, for instance, the multiplexing gateway server 202 replicates the request to every task management server in the task management system 2, awaits the response from each of the task management servers, and combines the response data into a single response to the requesting client program. In response to other requests, such as updating a specific task-list or task, the multiplexing gateway 202 may route the request to the appropriate task management server which hosts the task-list or task related data. One of ordinary skill in the art will appreciate that various parameters of the task management system 2 may be established in order for the multiplexing gateway server 202 to route requests to one or more appropriate task management servers, and that various techniques may be used to perform the routing.

Permissions

Figure 3A:
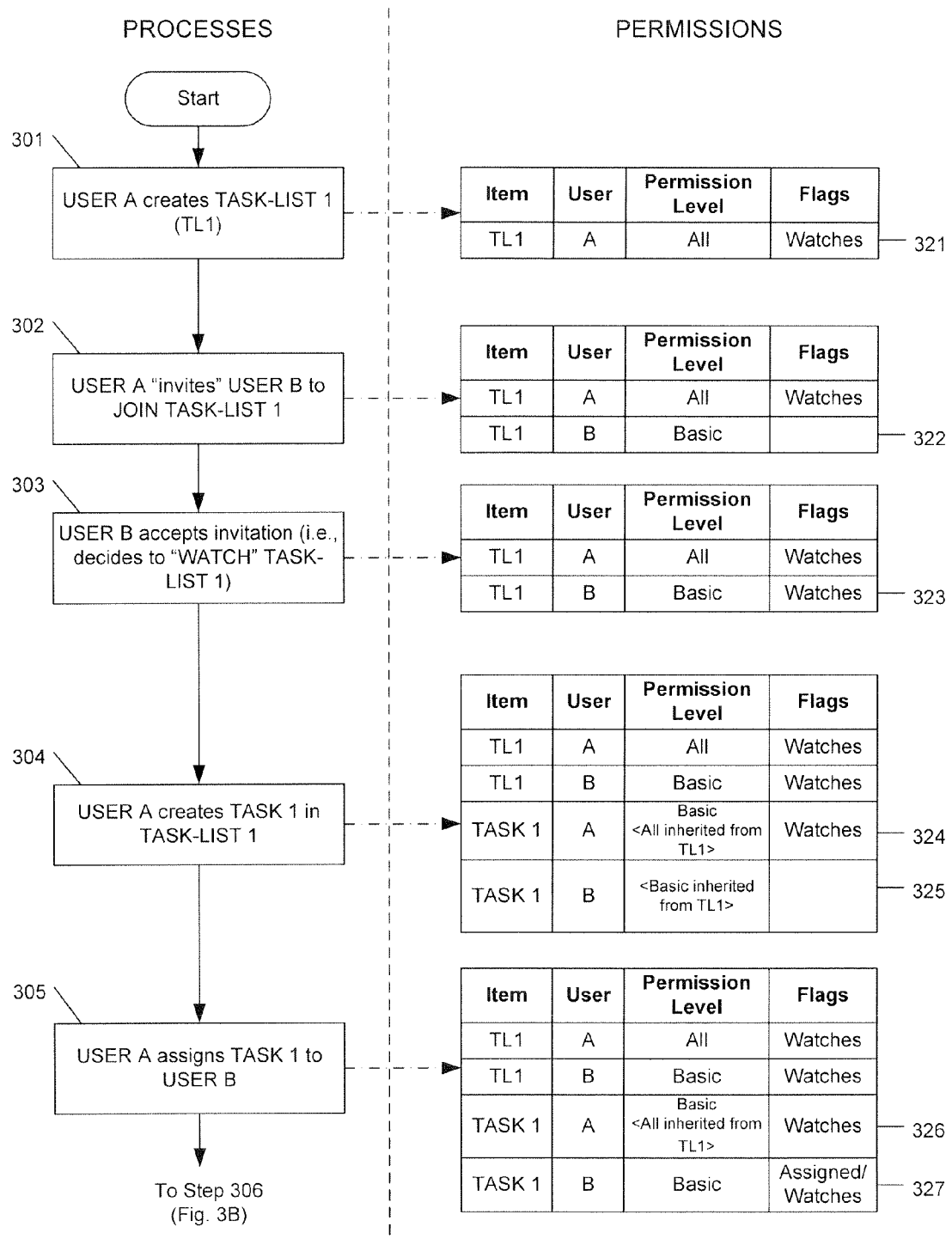
FIG. 3A is a flow diagram illustrating several interactions that a user may have with a Task Management System, and how the Task Management System automatically updates permissions in response to the interactions, according to one embodiment of the present invention.
Figure 3B:
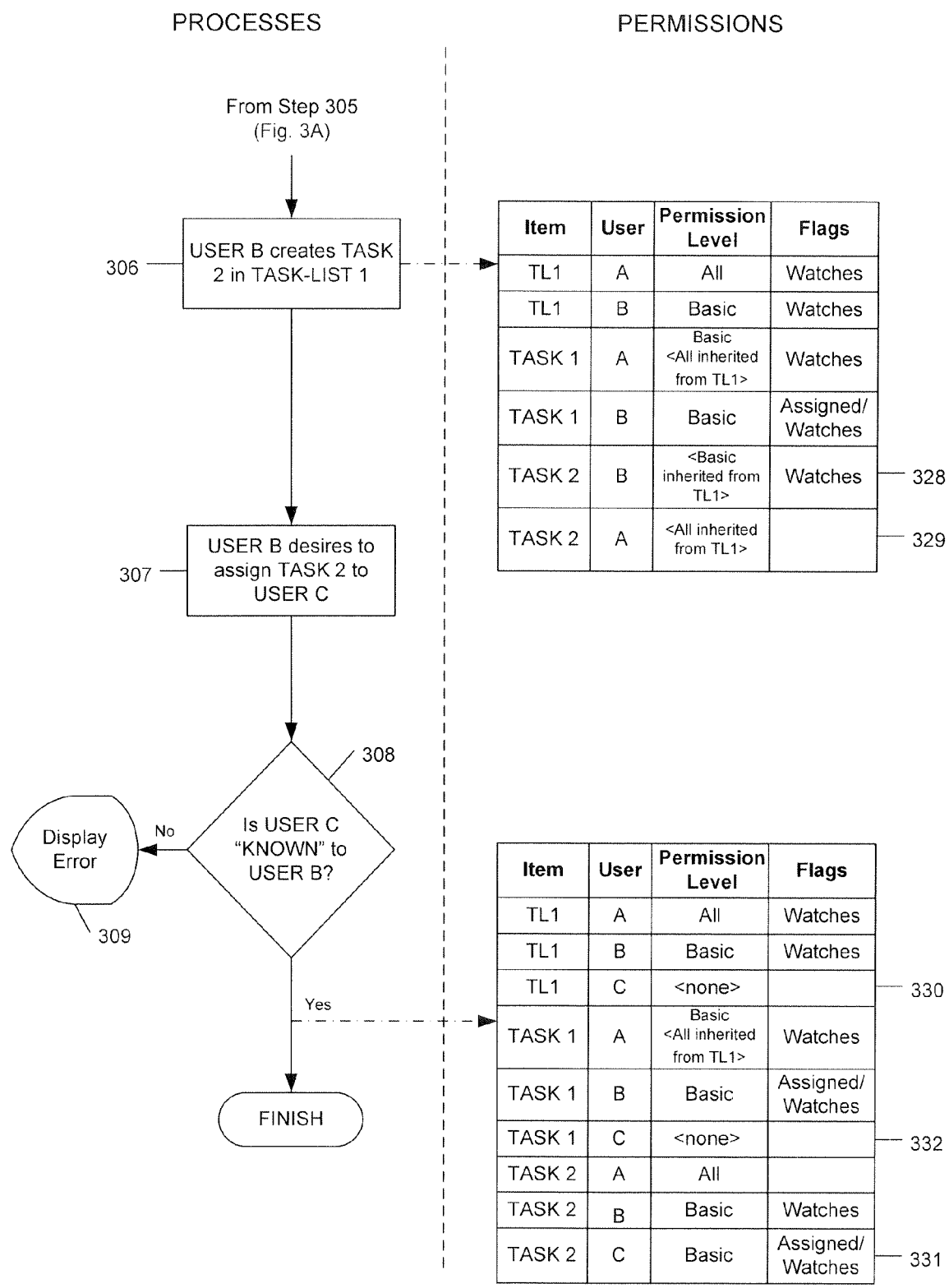
FIG. 3B is a flow diagram illustrating several interactions that a user may have with a Task Management System, and how the Task Management System automatically updates permissions in response to the interactions, according to another embodiment of the present invention.

A user's visibility and permissions to the various tasks and task-lists are managed intrinsically by the task management computer 16 in response to users' interactions. FIGS. 3A and 3B illustrate several of these interactions, in sequence, although these interactions can be performed independently of each other, or in various other sequences (not shown). Additionally, the "Permissions" shown in FIGS. 3A and 3B are illustrated as tables for exemplary purposes only, and are not intended to limit the permissions data of the task management system 2 to be created or stored as shown in these figures. Although FIGS. 3A and 3B are described below with reference to the task management computer 16 of FIG. 1, it is to be understood that these embodiments could be preformed by the global provider site 200 as depicted in FIG. 2 (see Structure of Exemplary Task Management System, above).

On a general level, and in the embodiments shown in FIGS. 3A and 3B, there are three levels of permissions associated with users in relation to task-lists or tasks (see Table 1, below). These permissions are "all", "basic", and "none", and allow a user to have various levels of interaction with the task-lists and tasks of the system, as will be understood from the descriptions below. As may be appreciated, "Basic" permission can range from being very expansive (only slightly less restrictive than "All"), or very limited (only slightly more expansive than "None").

As depicted in FIG. 3A, when User A creates a new task-list, Task-List 1 (TL1) at step 301, the task management computer 16 creates a permissions record for User A 321 giving User A "All" permissions to TL1 and stores this permissions record in the database 18. User A can then "invite" another user to join or "watch" the new task-list, TL1. "Watching" a task or task-list, in various embodiments of the task management system 2, refers to: (1) a user indicating an interest in the task, such that it will appear or be visible in a portion of the user's catalog (described below); and (2) being joined to a task-list (described further below). In one embodiment, users do not have to be "known" to each other in order to invite other users to join a task-list. In other embodiments, User A may be limited to inviting only "known" users to join TL1. At step 302, User A invites User B to join TL1. In response, the task management computer 16 creates a permissions record for User B 322 giving the user "Basic" permissions necessary to access the task-list. If User B chooses to accept the invitation, in other words decides to watch TL1, at step 403, the task management computer 16 changes the permissions record for User B to indicate User B is watching the task-list 323. In various embodiments, information indicating a user as "watching" or being "assigned" to a task-list or task could be stored separately from the permissions record.

User A can create a new task, TASK1, as a member of task-list TL1 at step 304. Upon doing so, a permissions record is created for User A 324 assigning the user permissions to TASK1 and indicating that User A is currently assigned responsibility to the task. In one embodiment, User A is explicitly given "Basic" permissions to TASK1 but has effective permissions of "All" inherited from the parent task-list TL1. In another embodiment, User A, as the original creator, may be assigned "All" permissions to the created task, in order to manage and administrate the permissions of others to that task, regardless of the user's permissions for the parent task-list. Note that although no specific permissions record is created for User B for TASK1, User B still has "Basic" permissions to TASK1 by virtue of the user's "Basic" permissions to task-list TL1 325. In other words, in the absence of a specific permissions record, User B "inherits" permissions to TASK1 from User B's corresponding permissions to the parent task-list TL1. If User A decides to assign responsibility for TASK1 to User B at step 305, the task management computer 16 will create a permissions record for User B 327 giving the user "Basic" permissions to the task and indicating that User B is currently assigned responsibility for the task. The task management computer 16 will also update the permissions record for User A for TASK1 326 to indicate that User A is no longer responsible for the task. In one aspect, assigning a task to another user signifies an indication that the other user is responsible for the task. This may signify that the other user is responsible for completing the task, or may only signify that the other user is responsible for completing or handling one portion of the task. Thus, the task management system 2 is configured to allow more than one user to be assigned to a particular task throughout the task's existence. In one embodiment, only one user may be assigned to a task at any given time. In various other embodiments, the task management system 2 may be configured to allow a task to be assigned to various users at any given time.

Continuing as depicted in FIG. 3B, if User B creates a new task, TASK2, as a member of task-list TL1 306, a permissions record is created for User B 328 giving the user "Basic" permissions to TASK2. As described above, since no specific permissions record is created for User A for TASK2, User A's permissions for TASK2 are inherited from the user's "All" permissions to task-list TL1 329. In alternative embodiments (not shown), because User A is not the original assignee or creator of the task, TASK2, the task management system 2 may be configured to allow User A to inherit only some permissions from the parent task-list, and thus effectively giving User A only "Basic" permission. If User B decides to assign responsibility for the task TASK2 to User C at step 307, the task management system 2 determines first if User C is "known" to User B, at step 308 (described below). If so, the task management computer 16 will create a permissions record for User C 331 giving the user "Basic" permissions to TASK2 and indicating that User C is currently assigned responsibility for the task. Note that although User C has basic permissions to the task, that user has no permissions to the parent task-list 330. Because User C has no permissions to the parent task-list TL1, User C also will have no permissions to any other tasks (such as TASK1 332) in the task-list, unless User C has explicitly been granted permission to a task (e.g., by having been assigned to a task, such as TASK2 331).

The task management computer 16 intrinsically manages the permissions as described above, and also provides the capability for users to manipulate the permissions for other users to tasks and task-lists directly or explicitly, as well as to establish more specific permissions for each user giving the system broad flexibility in the presentation of tasks and task-lists to users. The following table, Table 1, shows the elementary permissions managed intrinsically by the task management computer 16 and their effect:

TABLE 1

| Object | Permission | Effect |
|---|---|---|
| Task-List | None | User may not access, watch, or modify the task-list at all. |
| Task-List | Basic | User may watch the task-list, start new tasks, and grant other users "basic" access (i.e., by inviting other users to watch the task-list). |
| Task-List | All | User may remove or customize permissions for other users, as well as maintain task-list properties, e.g. name and description. |
| Task | None | User may not read or add task comments; may not close or re-open a task. User may not watch the task. User may not read any updates to the task description since the task was started. If the user does not have read access on the task's task-list, then the user may not access the task at all. |
| Task | Basic | User may watch, comment, close, re-assign or update the contents of the task. User may also grant basic access to the task to other users. |
| Task | All | User may remove or customize task permissions for other users. |

In addition to the above, users can explicitly can grant or deny the following more specific permissions to other users:

TABLE 2

| Object | Permission | Effect |
| --- | --- | --- |
| Task-List | access | User can see name and description of task-list |
| Task-List | read | User can see initial name and description of tasks within the task-list |
| Task-List | post | User can create new tasks |
| Task-List | delown | User can delete tasks that they started, which removes their visibility from the task-list. This does not close the task. |
| Task-List | join | User can watch the task-list and see new tasks as they are created |
| Task-List | delall | User can delete any tasks, which removes their visibility from the task-list. This does not close the task. |
| Task-List | admin | User can change permissions for other users. |
| Task | access | User can see name, description, assigned user, and status of the task |
| Task | read | User can read the task's comments |
| Task | post | User can make comments |
| Task | delown | User can remove comments that they made. |
| Task | join | User can watch the task and see new comments and status changes are the task is updated. |
| Task | delall | User can delete any comments |
| Task | admin | User can change permissions for other users. |

As previously noted, if a particular user has no explicit permissions for a task, the user's permissions are inherited from the parent task-list. This applies for the more specific permissions as well (see Table 2). For example, if a user has been explicitly granted "post" permission to a task but not "read" permission, the user's ability to see comments on the task added by other users will depend upon that user's permissions for the parent task-list. On the other hand, if a user has been explicitly denied "read" permissions on a task, that user will not be able to see comments from other users regardless of the parent task-list permissions. As may be appreciated, the flexibility of the task management system 2 may allow for various other unique permissions models or scenarios. For example, the task management system 2 is configured so that when a user explicitly changes the permissions of a task within a task-list, this overrides the task-list permissions, but does not change them. Additionally, if a user loses permission to a task-list, that user will lose permissions to tasks within that list, unless the user has been granted additional permissions to a task within that task-list (such as by having been assigned to the task).

Known Users and Prevention of "Spam"

In many embodiments of the invention, the task management system 2 is maintained globally, i.e. all users, task-lists, and tasks, are part of one large system regardless of any real-world affiliations or virtual segments of the user population. This allows one user to see and maintain one single view of tasks that span multiple spheres of interests, e.g. tasks and task-lists for work and tasks and task-lists for home, but it also creates a potential situation where a first user can assign tasks to a second user to force the task to become visible to the second user even though the second user has no affiliation with or interest in the first user. This would create the equivalent of "spam" email in that it would allow the first user to impose an assignment of a task upon the second without his consent or force another user to watch a task-list. In order to prevent such "spamming" of tasks and task-lists, embodiments of the present invention utilize two concepts: the "known user" and a two-step process of invitation and acceptance to watch task-lists.

Figure 7:
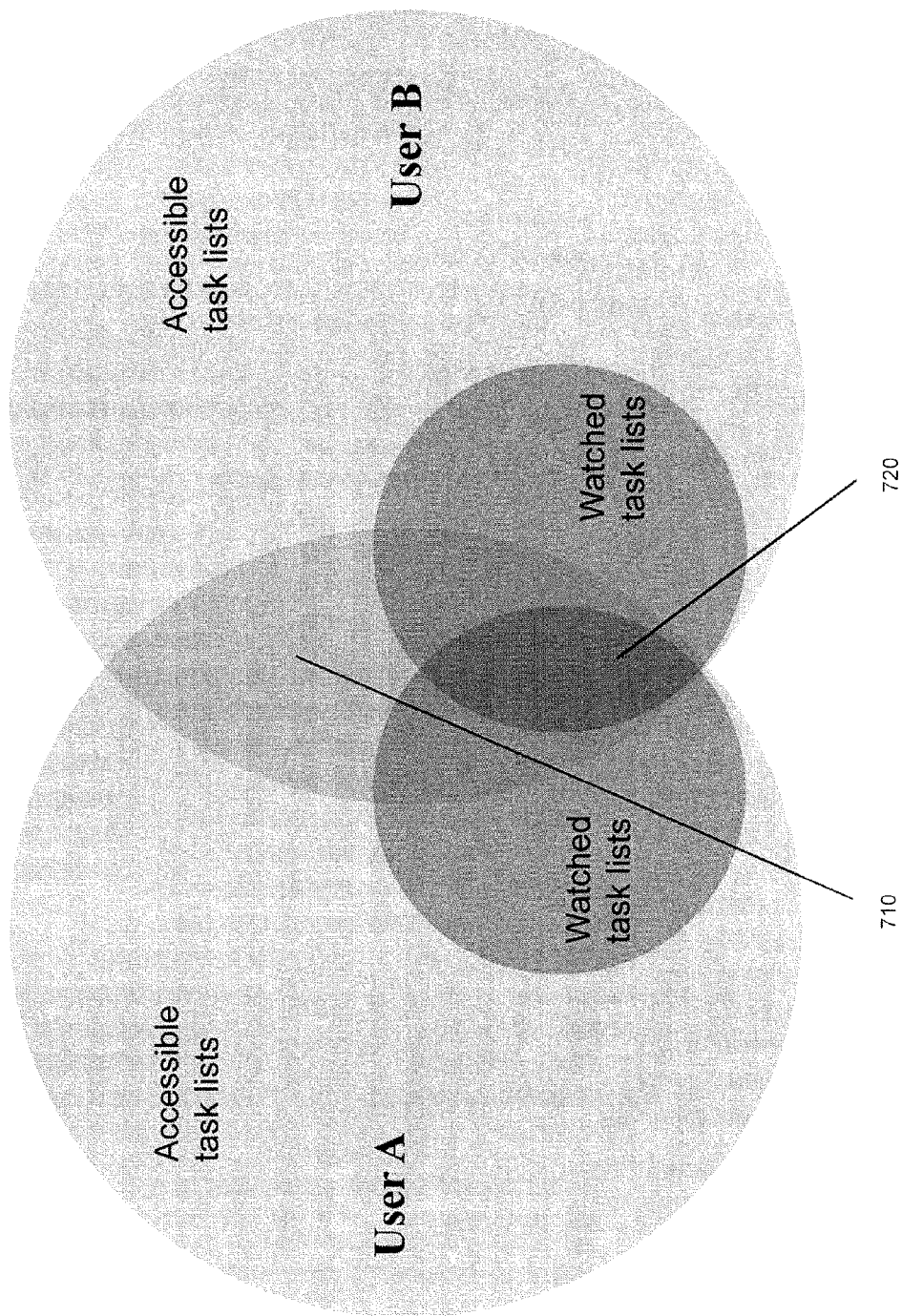
FIG. 7 illustrates the concept of "known" users of a Task Management System, according to one embodiment of the present invention.

Two users, such as User A and User B, are "known" to each other if there exists any task or task-list which both users are currently watching or joined, as represented by area 720 in FIG. 7. This creates an implicit "group" of known users to which User A may assign tasks. Further, for User B to watch a task-list requires a two-step process: (1) User A must "invite" user B to watch the task-list, thus implicitly setting the permissions for User B to the task-list and thereby giving User B "access" to the task-list, as described above; and (2) User B must "accept" the invitation by affirmatively choosing to watch the task-list. Requiring this two-step process prevents the situation where User A can force User B to watch User A's task-list without user B's consent.

In an alternative embodiment (not shown), User A can invite User B to join TL1 at step 302, only if User B is known to User A. If User B is not known to User A, the task management computer 16 returns an error message to User A indicating, for example, that only known users of the system can be invited to join TL1.

As can be seen in FIG. 3B, in one embodiment, when User B desires to assign TASK2 to User C, the task management computer 16 is configured to allow this assignment only if User C is known to User B. In doing so, the task management computer 16 determines at step 308 if User B and User C are currently watching a common task or task-list. If so, the task management computer 16 permits the assignment and User C's permissions to TASK2 are set to "Basic" as described above. If not, the task management computer 16 returns an error message to User B, indicating, for example, that TASK2 may only be assigned to a "known" user. In other embodiments, assignments may be allowed based on other existing relationships between users.

Because the task management system 2 is configured to prevent users from "spamming" each other with task assignments or forcing other users to watch task-lists, it is assumed that upon initial implementation of the system, all users would be strangers to one another. In such a case, the users would be unable to assign tasks to other users or force other users to join task-lists. Therefore, the task management system 2 is configured to allow users to manually input the usernames or email addresses of other users of the system, when desiring to invite these other users to join a task-list. In various embodiments, this may also be possible when assigning a task to other users. In one embodiment, if User A desires to invite User B to join a task-list, but Users A and B are not "known" to each other within the system 2, User A could input User B's username or handle (such as "User B") and User B would be given Basic permissions to the task-list (as described above). In another aspect, if User A desires to assign a task to User B, for instance, User A could input User B's email address, and the task management computer 16 would be configured to generate an email to User B indicating that User A desires to assign a task to User B. As can be appreciated by one of skill in the art, if User B was not yet a user of the system 2, the email may also provide a hyperlink or other means for allowing User B to register for the task management system 2.

In another embodiment (not shown), an individual at a local customer site 230 may desire to register multiple users at once (such as all employees at a company), and indicate that these users would be known to each other upon registration, so that they can immediately begin sharing work-related tasks, for instance.

Audience Selection

Figure 5:
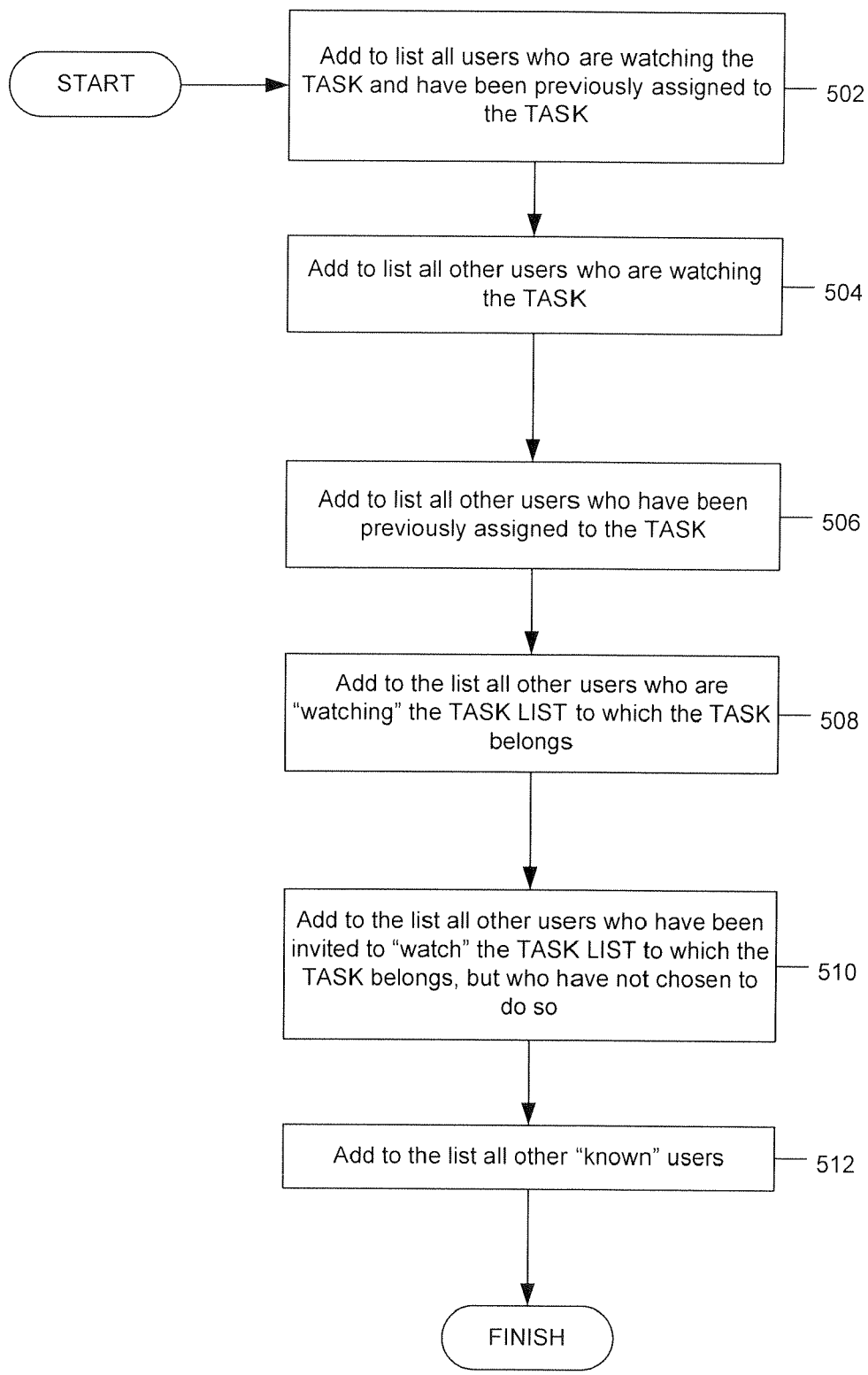
FIG. 5 is a flow diagram illustrating the steps of a Task Management System populating a heuristic list of potential users who may be assigned to a task, or invited to a task-list by another user of the System, according to one embodiment of the present invention.

As the number of task-lists and tasks that User A is watching increases, so too will the number of users known to User A. Therefore, in various embodiments of the present invention, the task management computer 16 is configured to present a list of known users to User A, in response to User A indicating a desire to invite another user to a task-list, or assign a task to another user. For example, after User A has created TASK1, as shown at step 304, User A may desire to assign TASK1 to another user. In order to simplify this interaction, the task management computer 16 populates a list of potential users who may be assigned the task. In one embodiment, shown in FIG. 5, the list is a heuristic list and presents the most probable order of users to which User A would want to assign the task. FIG. 5 represents one embodiment of populating a heuristic list, although the "most probable" order can vary from that shown in FIG. 5.

As shown in FIG. 5, the task management computer 16 first adds to the list all users who are watching the task and have previously been assigned the task. Because User A created the task, User A is automatically designated as watching the task by the task management computer 16. Therefore, in one embodiment, User A would be the first user on the list. However, because the task management system 2 is configured to allow a task to be assigned to various users throughout its life, several additional users may be added to the list at step 502. The task management computer 16 at step 504 then adds to the list all other users who are watching the task and, by implication, have not been previously assigned to the task. At step 506, all other users that have been previously assigned to the task, but are not also watching the task, are added to the list. At step 508, the task management computer 16 adds to the list all other users who are watching the task-list to which the task belongs. At step 510, the task management computer 16 adds to the list all other users who have been invited to watch the task-list to which the task belongs, but who have not actively chosen to do so. Finally, all other known users are added to the list at step 512. As described above, these are users who are watching a task or task-list in common with User A, but who did not fit into the groups identified above at steps 502-510.

As can be appreciated, because the permissions of the task management system 2 are constantly changing as users create task-lists and tasks, assign tasks to others, invite others to join task-lists, etc., the heuristic list is configured to be updated accordingly. Thus, each time User A chooses to assign a task to another user, for instance, the list of potential users presented to User A may be different.

In another embodiment, the task management system 2 is configured to simplify the list and place User A, along with all other users who have been assigned to the task at some point at the beginning of the list, followed by those users who are watching the task-list to which the task belongs, those users who have access to the task-list, and all other "known" users. In other embodiments (not shown), the task management system 2 is configured to be flexible and add users to the list in various other sequences.

As described above, a user (e.g., User A) may desire to invite an "unknown" user (e.g., User X) to a task-list, or may desire to assign a task to an "unknown" user. In this case, User X's name would not appear on the list presented to User A. Thus, in one embodiment (not shown), User A may be presented with an option at the bottom of the list, such as "Select another user". Upon selection of this choice, User A could input User X's username or email address, as described above.

Catalog of Tasks and Task-Lists

Figure 8:
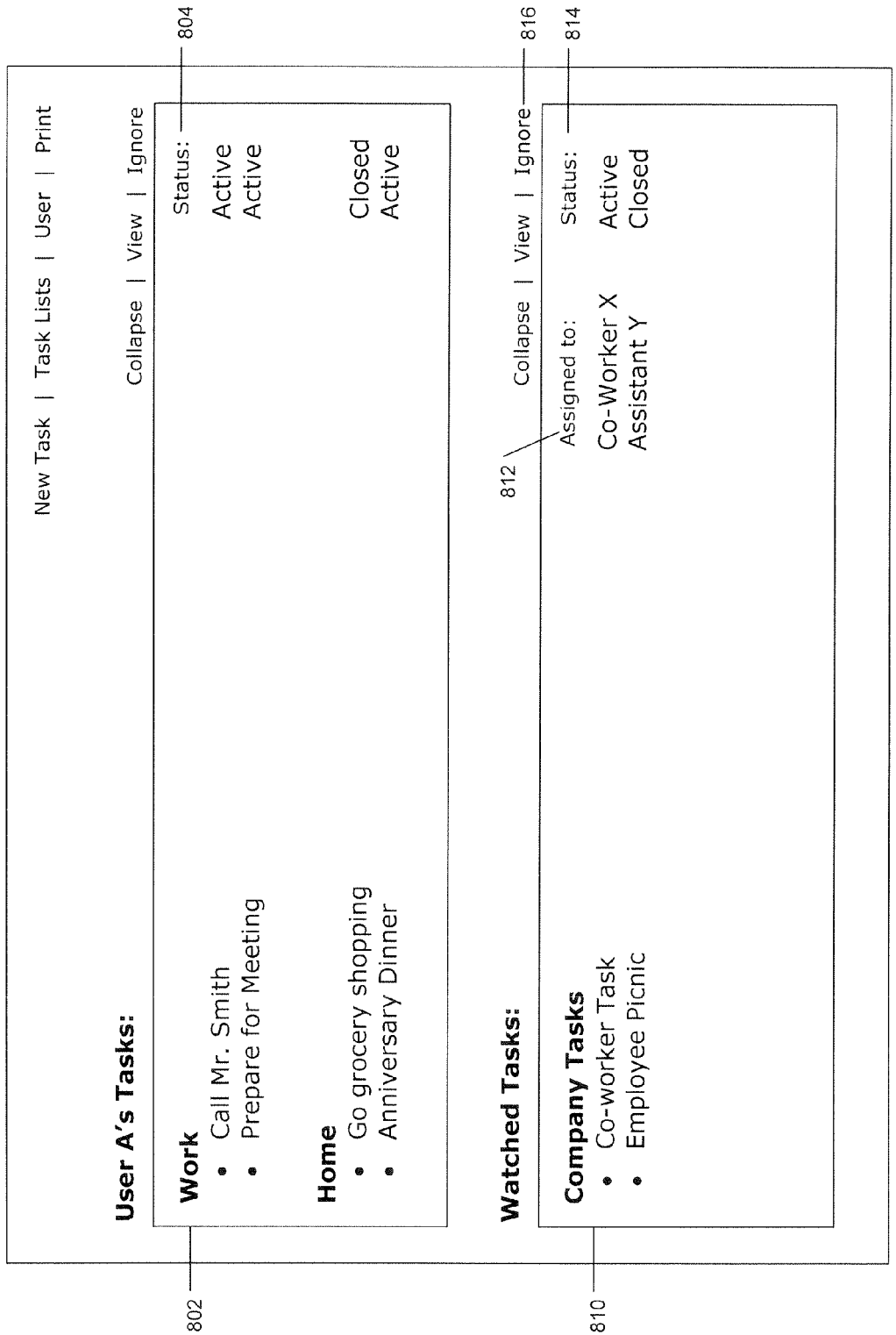
FIG. 8 is an exemplary screenshot, illustrating the catalog of tasks and task-lists visible to a user, according to one embodiment of the present invention.

The task management system 2 allows users to see the tasks and task-lists that they are watching, through a catalog, as can be seen in FIG. 8. Generally, the catalog presents to the user, in a visible manner: (1) tasks assigned to that user, and (2) task-lists or tasks that a user is watching. However, in various embodiments, more or less information may be visible to a user. By watching tasks, a user is presented with notifications when the status of a task changes, or when new comments have been added to the task.

FIG. 8 illustrates an exemplary screen shot of one embodiment of a user interface of the task management system 2, which also illustrates the catalog of tasks and task-lists. The upper portion 802 ("User A's Tasks") of the catalog represents the tasks to which User A is assigned, such as "Call Mr. Smith", and "Go grocery shopping". In one embodiment, the catalog also presents the parent task-list to these tasks. For instance, the task "Call Mr. Smith" falls under the "Work" task-list and the task "Go grocery shopping" falls under the "Home" task-list. In one embodiment, the task management system 2 is configured to automatically force a user to watch any tasks that are currently assigned to them. The catalog also presents the status 804 of the tasks that are assigned to User A, such as "Active" or "Closed". User A may desire to view the details of the task (such as by double-clicking on the task name, or other method known in the art), in order to see comments or notes which User A's spouse may have added to the task (not shown). As may be understood, comments or notes may be added to tasks to indicate additional information that is relevant to the tasks. For example, User A may add a comment to the task "Anniversary Dinner", indicating that "Reservations 7:00 p.m., at Chez Moi restaurant". If User A's spouse was also assigned this task, or was watching this task, and had the requisite permissions to read comments on the task (see above), then User A's spouse would be notified of updates to the task, and would be able to see the details of the "Anniversary Dinner" task.

The lower portion 810 ("Watched Tasks") of the catalog represents the tasks which User A has chosen to watch, but are not assigned to User A. For example, User A may have been invited by another user to join task-list "Company Tasks". User A may have chosen to join or watch the task-list. Upon doing so, the task-list "Company Tasks" would appear in User A's "Watched Tasks" portion 810, as well as all tasks falling under this task-list, such as "Co-worker Task" and "Employee Picnic", as shown in FIG. 8. As tasks are added to the "Company Tasks" task-list, they will automatically appear in User A's catalog, since he is watching the parent task-list. The task management system 2 also presents the status 814 of these watched tasks to User A, as described above with regard to User A's assigned tasks. This allows User A to see which tasks are still active, and which have been closed. Additionally, because the tasks falling under the "Watched Tasks" portion 810 are not assigned to User A, the catalog indicates which users of the system 2 are assigned to the task 812.

The task management system 2 allows a user to "Ignore" 816 one or more tasks falling within the "Watched Tasks" portion 810 of a user's catalog, in order to allow the user to personalize and manage the catalog. For example, User A may select to watch "Company Tasks", and as described above, this results in User A automatically watching all tasks falling within "Company Tasks". The number of member tasks to this list can be very high, and thus User A may only desire to watch certain tasks and ignore all others. User A can also "collapse" 818 certain task-lists, so that only the name of the task-list would be visible, but the tasks within the task-list would be hidden, as can be appreciated by one of ordinary skill in the art.

In another aspect, User A can choose to view tasks assigned to another user (not shown) by viewing the upper portion 802 of another user's catalog. In this embodiment, User A can view only those tasks to which User A has permission to view.

For example, if User A chooses to view all tasks assigned to User B, User A will be able to see only those tasks to which User A has at least Basic permission or those tasks contained within task-lists to which User A has Basic permissions. The subset of User B's tasks which User A has permission to view is represented by the area 710 in FIG. 7.

Differential Update

In many embodiments of the invention, much of the consumption or network bandwidth available to the task management computer 16 results from the frequent updating of the status of the tasks displayed in the user's catalog. One embodiment may contain client programs that update the catalog of currently active users through requests to the various task management servers at various intervals (such as every 30 seconds). To reduce the load, one embodiment of the task management system includes a Differential Update feature which stores data for each user that contains the "last seen state" of each task or task-list for which the user is watching, and responds to catalog update requests with only information that has changed since this "last seen state", thus reducing network traffic.

Figure 6:
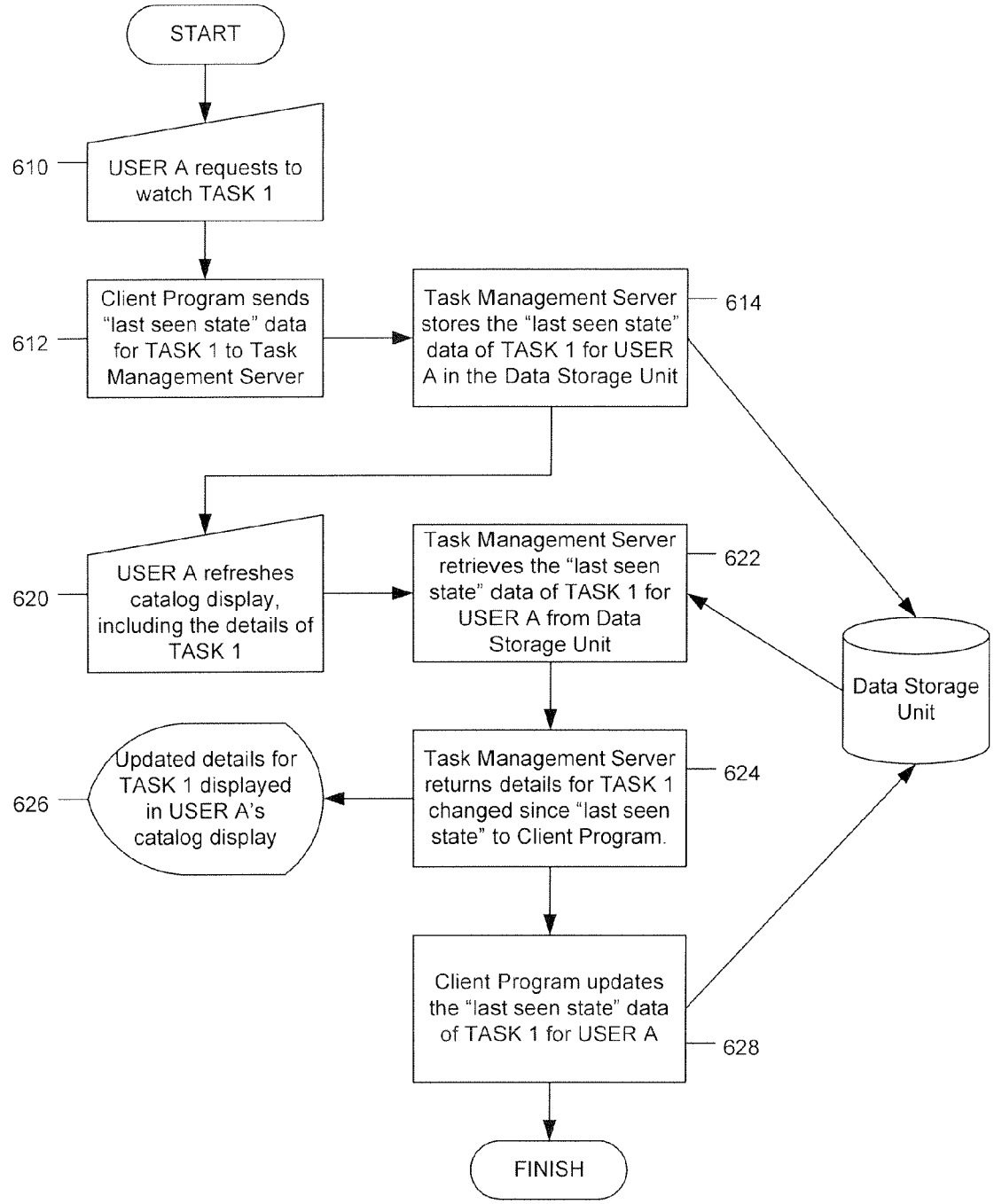
FIG. 6 is a flow diagram illustrating the steps of a Task Management System updating a catalog of watched task-lists and tasks that is visible to a user utilizing the Differential Update feature, according to one embodiment of the present invention.

As illustrated in FIG. 6, when a user chooses to watch a particular item such as a task or task-list at step 610, the client program at step 612 indicates to the task management server 210 the "last seen state" of the item, i.e. the current state of the item viewed by the user at the time the user chooses to watch the item. The task management server 210 stores this "last seen state" data for the user at step 614 in the database 212. In subsequent requests by the user for the details of the item, such as update requests to the user's catalog display (e.g., at step 620), the task management server 210 retrieves the "last seen state" data for the item at step 622 from the database 212 and responds only with data for the item which has changed since the "last seen state" at step 624. The client program subsequently updates the "last seen state" and sends the data to the task management server 210 for storage in the database 212 to reflect the "last seen state" of the item, at step 628. It is to be appreciated that the process can be repeated as User A requests to watch various tasks or task-lists or requests various other updates of User A's catalog, for example.

The Differential Update feature thus allows the task management system 2 to handle a much greater number of users with more frequent updates while consuming less network bandwidth.

Task-List Aliasing

Figure 4:
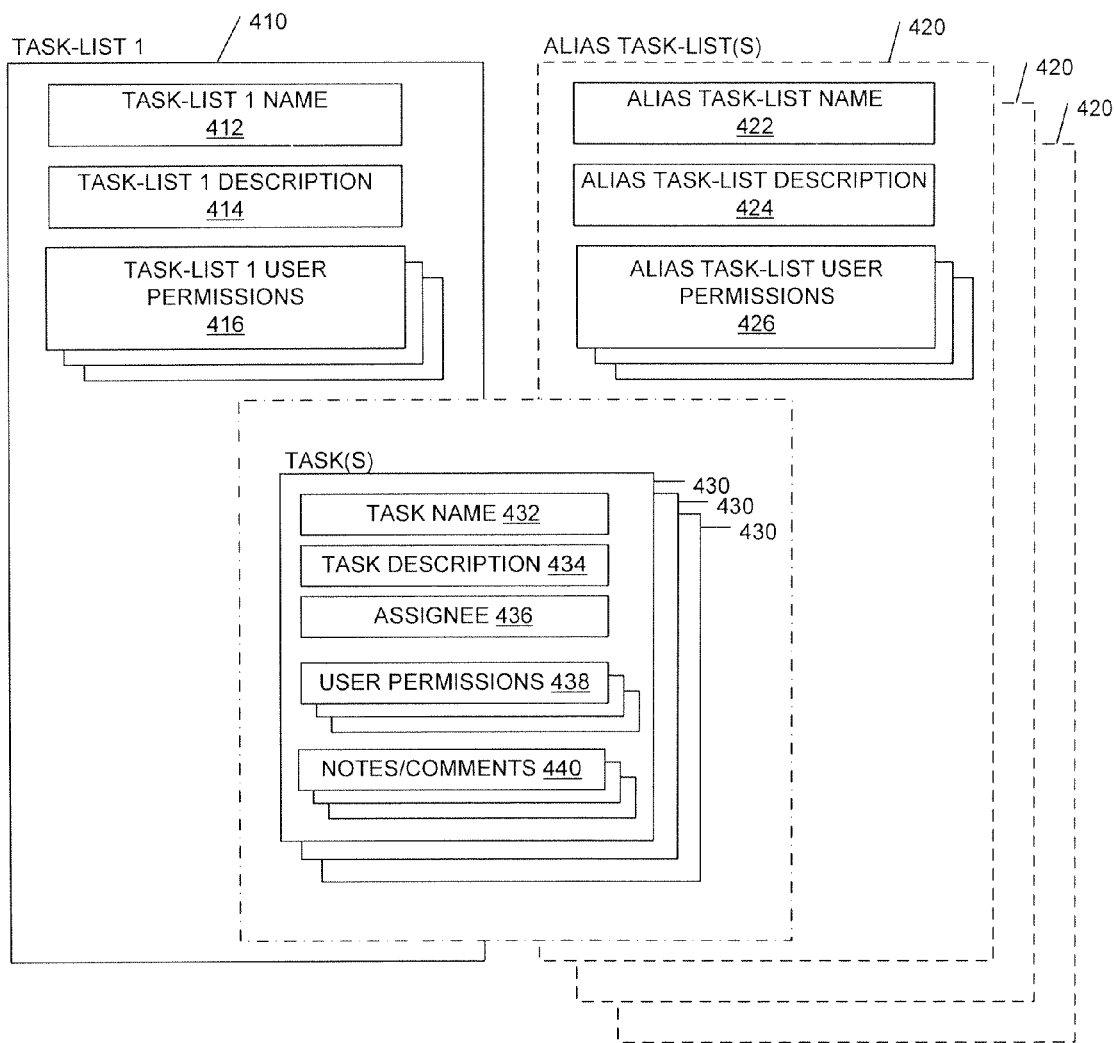
FIG. 4 illustrates a task-list aliasing feature of a Task Management System, according to one embodiment of the present invention, which demonstrates that one or more task-lists may contain the same member group of tasks.

In one embodiment of the present invention, the task management system 2 provides a task-list aliasing feature which allows for one set of tasks to be members of multiple task-lists. An example illustrated in FIG. 4 shows a task-list (TASK-LIST 1) 410 with a name 412, description 414, and user permissions data 416. TASK-LIST 1 also contains one or more tasks 430, each with a name 432, description 434, currently assigned user(s) 436, user permissions 438, and notes and comments 440. The task-list aliasing feature allows one or more new task-lists (ALIAS TASK-LIST) 420 to be created, each with their own name 422, description 424, and user permissions data 426, but containing the same set of tasks as the first task-list, TASK-LIST 1. Note that the tasks 430 are not duplicated in each alias task-list. Rather, the individual tasks 430 are members of both TASK-LIST 1 410 and each ALIAS TASK-LIST 420. Thus, if a task is created in TASK-LIST 1, this task will automatically become a member of any alias task-lists of TASK-LIST 1, and vice versa.

The task-list aliasing feature provides flexibility in the management of tasks across multiple groups or organizations, such as multiple local customers associated with a local customer site 230, and/or multiple remote users 222, 224. For example, if a software development company named "Software Inc." had a customer named "Customer Co.", they may wish to share a task-list for the monitoring and management of tasks associated with development of Customer Co.'s website. However, each company may want to see the task-list in a different way. For example, Software Inc. would probably want to see a task-list named or described as "Customer Co. Website Project", whereas Customer Co. would want to see a task-list named or described as "Website Project". Further, Customer Co. may want to explicitly set permissions for project management personnel to the task-list to allow creation of tasks, but not assignments or changes in status. Software Inc. would want the task management system 2 to inherently manage the task-list permissions.

The task-list aliasing feature allows the task management system 2 to satisfy both Software Inc. and Customer Co.'s requirements by allowing each to create and configure their own task-list, and have both task-lists share the same set of member tasks.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A task management system connected to a communication network with one or more users operating respective computing devices, the system comprising:
   one or more task management computers configured to:
   (1) interact with the users via respective computing devices over the communication network;
   (2) enable a first user to identify a task-list or a task, the task being a member of at least one task-list, the task-list and the task having a plurality of associated permissions, respectively, and each of the plurality of associated the permissions comprising a level of interaction with the task-list or the task;
   (3) enable the first user to generate a designation for a second user based on an interaction between the first user and the second user, the designation comprising an association of the second user with the task-list or the task and the second user being selected from a list of potential second users, the list being configured to present to said first user the most probable order of potential second users whom said first user would desire to associate with the task-list or the task;
   (4) initially assign the second user permissions with respect to the task-list or the task by creating a permissions record for the second user, the initial permissions being based on said interaction;
   (5) associate the second user with the task-list or said task; and
   (6) automatically change said permissions of said second user with respect to said task-list or said task with based on said designation of said second user.

2. The task management system of claim 1, wherein said association comprises the second user joining the task-list.

3. The task management system of claim 2, wherein said second user is selected from a list of potential second users, the list comprising a heuristic list being configured to present to said first user the most probable order of potential second users whom said first user would desire to join the task-list, with the most probable potential second users being placed at the beginning of said heuristic list, and the least probable potential second users being placed at the end of said heuristic list.

4. The task management system of claim 2, configured to enable said second user to choose to join said task-list in response to said designation.

5. The task management system of claim 1, wherein said association comprises the second user being made responsible for the task.

6. The task management system of claim 5, wherein said second user is selected from a list of one or more potential second users comprising users of the task management system who are joined to at least one task-list in common with said first user.

7. The task management system of claim 1, wherein said most probable order of potential second users, listed in order, is:
   said first user, along with all other users who have been specified as being responsible for said task;
   users who have chosen to join the task-list to which said task belongs;
   users who have been selected to join said task-list, but who have not chosen to join said task-list; and
   all other users of the task management system who are joined to at least one task-list in common with said first user.

8. The task management system of claim 1, further comprising:
   a multiplexing gateway server, configured to receive a request from a user, including at least said designation, transmit said request to one or more task management computers, receive a response from said task management computers, and transmit said response to said user.

9. The task management system of claim 8, wherein one or more of said task management computers are located locally to said multiplexing gateway server.

10. The task management system of claim 8, wherein one or more of said task management computers are located remotely from said multiplexing gateway server.

11. The task management system of claim 1, configured to allow multiple task-lists to share a common set of member tasks, each task-list maintaining unique task-list attributes, such as task-list name, task-list description, and task-list permissions.

12. The task management system of claim 11, configured to:
   receive a request from one of said users to create a task as a member of a first task-list of said multiple task-lists, said task inheriting automatically said first task-list permissions; and
   automatically designate said task as a member of said other multiple task-lists.

13. The task management system of claim 1, configured to present to each of said users a catalog of task-lists and tasks, comprising:
   tasks for which said user has been made responsible by said designation;
   task-lists that said user has been invited to join, by one or more other users by said designation, and has chosen to join; and
   tasks that are members of task-lists that said user has been invited to join and has chosen to join.

14. The task management system of claim 13, configured to keep said user aware of changes to said catalog of task-lists and tasks by:
   (a) displaying a presentation of said task-lists and tasks to said user;
   (b) storing the state of said task-lists and tasks, at the task management computer, at the time of said presentation to said user;
   (c) providing, at established time intervals, only changed information from the time when the state of said task-lists and tasks was stored at step (b); and
   (d) repeating steps (a)-(c).

15. A computer-readable storage medium storing an application for shared task management among a plurality of users, said application, when executed, directing a computer to perform the steps of:
   (A) receiving from a first user an identification of a task-list or a task, the task being a member of at least one task-list, the task-list and the task having a plurality of associated permissions, respectively, and each of the plurality of associated permissions comprising a level of interaction with the task-list or the task;
   (B) receiving from a first user a designation for a second user based on an interaction between the first user and the second user, the designation comprising an association of the second user with the task-list or the task and the second user being selected from a list of potential second users, the list being configured to present to said first user the most probable order of potential second users whom said first user would desire to associate with the task-list or the task;
   (C) initially assigning the second user permissions with respect to the task-list or the task by creating a permissions record for the second user, the initial permissions being based on said interaction;
   (D) associating the second user with said task-list or said task; and
   (E) automatically changing said permissions of said second user with respect to said task-list or said task based on said designation of said second user.

16. The computer-readable storage medium of claim 15, wherein the association step (A) comprises the second user joining the task-list.

17. The computer-readable storage medium of claim 15, wherein the association comprises the second user being made responsible for the task, and said application further directs said computer to perform the step of enabling said first user to make a selection of the second user from a list of potential second users who are joined to at least one task-list in common with said first user.

18. The computer-readable storage medium of claim 17, wherein said application further directs said computer to perform the step of:
   generating said list of potential second users, said list being a heuristic list configured to present to said first user the most probably order of potential second users that said first user would desire to specify as being responsible for said task, with the most probable potential second users being placed at the beginning of said heuristic list, and the least leas probable potential second users being placed at the end of said heuristic list;
   said step of generating said list occurring prior to said step of enabling said first user to make said selection of the second user from said list.

19. The computer-readable storage medium of claim 15, wherein said application further directs said computer to perform the step of:

presenting to said plurality of users a catalog of task-lists and tasks, said catalog comprising:
tasks for which said plurality of users has been made responsible by said designation;
task-lists that said plurality of users has been invited to join, by one or more other users by said designation, and has chosen to join; and
tasks that are members of task-lists that said plurality of users has been invited to join and has chosen to join.

* * * * *

UNITED STATES PATENT AND TRADEMARK OFFICE
CERTIFICATE OF CORRECTION

PATENT NO. : 8,027,861 B2  Page 1 of 1
APPLICATION NO. : 11/422120
DATED : September 27, 2011
INVENTOR(S) : Brintle It is certified that error appears in the above-identified patent and that said Letters Patent is hereby corrected as shown below:

Column 14

Line 46, delete "the"

Line 64, "said task-list or said task with" should read --said task-list or said task--

Column 16

Line 63, delete "leas"

Signed and Sealed this
Twenty-first Day of February, 2012

David J. Kappos
*Director of the United States Patent and Trademark Office*